US012705612B2

(12) United States Patent
Vijayaraghavan

(10) Patent No.: US 12,705,612 B2
(45) Date of Patent: Aug. 11, 2026

(54) INTERACTIVE USER INTERFACE SYSTEMS AND METHODS FOR ANALYZING TRANSACTION ATTRIBUTES AND DISPUTE INFORMATION USING BLOCKCHAIN

(71) Applicant: Worldpay, LLC, Symmes Township, OH (US)

(72) Inventor: Ramesh Vijayaraghavan, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 19/297,735

(22) Filed: Aug. 12, 2025

(65) Prior Publication Data

US 2026/0017649 A1 Jan. 15, 2026

Related U.S. Application Data

(63) Continuation of application No. 17/955,993, filed on Sep. 29, 2022, now Pat. No. 12,423,690, which is a (Continued)

(51) Int. Cl.
*G06Q 20/38* (2012.01)
*G06Q 20/40* (2012.01)

(52) U.S. Cl.
CPC ....... *G06Q 20/389* (2013.01); *G06Q 20/4016* (2013.01); *G06Q 20/407* (2013.01)

(58) Field of Classification Search
CPC . G06Q 20/389; G06Q 20/4016; G06Q 20/407
See application file for complete search history.

(56) References Cited

U.S. PATENT DOCUMENTS 9,786,015 B1 10/2017 Roumeliotis
2002/0194119 A1 12/2002 Wright et al.
(Continued)

FOREIGN PATENT DOCUMENTS

EP 3364354 A1 * 8/2018 .......... H04L 63/123
WO 2017210519 A1 12/2017
WO 2018001195 A1 4/2018

OTHER PUBLICATIONS

"Blockchains and Online Dispute Resolution: Smart Contracts as an Alternative to Enforcement", May 2016, Rikka Koulu (Year: 2016).*
(Continued)

*Primary Examiner* — Duan Zhang
(74) *Attorney, Agent, or Firm* — Bookoff McAndrews, PLLC

(57) ABSTRACT

Decentralized computer systems and methods are disclosed for analyzing transaction attributes and dispute information using blockchain. One method includes: receiving a first transaction information of a first transaction, wherein the transaction information includes attributes of the first transaction; generating a blockchain entry that stores the received attributes in a shared ledger to participants of the blockchain; receiving an input of a selection of an attribute of the first transaction from a participant of the blockchain to analyze other transactions having the selected attribute; compiling a list of other transactions having the selected attribute; receiving transaction information for each transaction of the list of other transactions; and generating, on a user interface, an analytics report of the attributes of the other transactions.

20 Claims, 7 Drawing Sheets

Related U.S. Application Data continuation of application No. 15/687,194, filed on Aug. 25, 2017, now Pat. No. 12,051,065.

(56) References Cited

U.S. PATENT DOCUMENTS

| | | | | |
|---|---|---|---|---|
| 2008/0140576 | A1 | 6/2008 | Lewis | |
| 2011/0047008 | A1* | 2/2011 | Rule | G06Q 30/0283 705/400 |
| 2012/0198369 | A1 | 8/2012 | Sorin | |
| 2013/0232074 | A1 | 9/2013 | Carlson et al. | |
| 2014/0108251 | A1 | 4/2014 | Anderson | |
| 2015/0134512 | A1 | 5/2015 | Mueller | |
| 2016/0044380 | A1 | 2/2016 | Barrett | |
| 2016/0254910 | A1 | 9/2016 | Finlow-Bates | |
| 2016/0321661 | A1 | 11/2016 | Hammond | |
| 2017/0109735 | A1* | 4/2017 | Sheng | G06Q 20/3678 |
| 2017/0124570 | A1 | 5/2017 | Nidamanuri | |
| 2017/0132625 | A1 | 5/2017 | Kennedy | |
| 2017/0148016 | A1 | 5/2017 | Davis | |
| 2017/0148025 | A1 | 5/2017 | Le et al. | |
| 2017/0295023 | A1* | 10/2017 | Madhavan | G06F 21/40 |
| 2018/0241573 | A1* | 8/2018 | Ramathal | G06Q 20/02 |
| 2020/0235947 | A1* | 7/2020 | Baykaner | H04L 9/3236 |

OTHER PUBLICATIONS

"Dispute reolution in blockchain: Do you need an umbrella?", Bacon Lee, Mondaq Business Briefing, Mar. 7, 2017 (Year: 2017).

* cited by examiner

INTERACTIVE USER INTERFACE SYSTEMS AND METHODS FOR ANALYZING TRANSACTION ATTRIBUTES AND DISPUTE INFORMATION USING BLOCKCHAIN

CROSS-REFERENCE TO RELATED APPLICATION(S)

This patent application is a continuation of and claims the benefit of priority to which is a continuation of U.S. application Ser. No. 17/955,993, which is a continuation of U.S. application Ser. No. 15/687,194, filed on Aug. 25, 2017, now U.S. Pat. No. 12,051,065, the entireties of which are incorporated herein by reference.

FIELD OF DISCLOSURE

The present disclosure relates generally to the field of payment transactions and, more particularly, to interactive user interface systems and methods for analyzing transaction attributes and dispute information using blockchain.

BACKGROUND

In current payment transactions between consumers ("cardholders" or "users") and merchants, it may be common for merchants and/or the respective acquiring institutions ("acquirers") of the merchants to have a dispute over a term of the payment transaction with consumers and/or and the issuing institutions ("issuers") of the consumers. Currently, the process for resolving these disputes may rely on the payment network as an intermediary for dispute resolution process. While this process ("network dispute resolution process") may be the current approach to resolve disputes and/or chargebacks between the cardholder and merchants, the process may be complicated, lengthy, and cumbersome for both the issuers, consumers, merchants, and/or acquirers. In the network dispute resolution process, the consumer (e.g., "cardholder") may initiate the dispute by contacting the consumer's issuer, and then the issuer may check for risk and/or fraud associated with the payment transaction and submit the dispute to the payment network. Subsequently, the payment network may dispatch the dispute/chargeback to the merchant for acceptance and/or representment.

In the event that the parties to the dispute (e.g., consumer, issuer, merchant, acquirer, etc.) cannot agree after several attempts at the network dispute resolution process, one of the parties may resort to arbitration, which may be an expensive process in which the payment network arbitrates and decides on liability. Thus, there is a desire for a system and method for enabling consumers and their issuers to resolve disputes with merchants and their respective acquirers in a dispute resolution process that is efficient and reduces costs for parties by working collaboratively outside the payment network in a manner that benefits the involved parties.

In using the payment network as an intermediary, the current network dispute resolution process is also cumbersome, lengthy, and dependent on the rules set by payment networks. Payment network specific dispute rules may cause costly charges to acquirers and merchants to comply with the frequent changes in payment networks or their rules. There may be an increase in fraudulent and invalid claims due to intermediaries in the process. Thus, there is also a desire for a dispute resolution process that is transparent and standardized, but which also reduces risks and incidents of fraud. This information could be used by the merchants to proactively stop the fulfillment of goods and services associated with fraudulent accounts at the time of the transaction. Additionally, there is a desire for a user interface system and method that may analyze various transaction information stored in the blockchain.

SUMMARY

According to certain aspects of the present disclosure, systems and methods are disclosed for efficient transaction dispute management using blockchain.

In one embodiment, a computer-implemented method is disclosed for efficient transaction dispute management using blockchain. The method comprises: receiving transaction information of a transaction for a good or service originating at a merchant, wherein the transaction information includes (1) an identifier of an issuer of a payment source account of a user for applying resources to the transaction, (2) an identifier of an acquirer of a payment account of the merchant for depositing the applied resources for the transaction, (3) the amount of resources to be applied to the transaction, and (4) an identification of the good or service transacted; generating a blockchain entry that stores the received transaction information in a shared ledger, wherein the shared ledger is accessible to participants of the blockchain comprising at least the issuer of the payment source account of the user and the acquirer of the payment account of the merchant; receiving in a new data structure of the shared ledger, from one or more of the participants, (1) an indication of a dispute of one or more data of the transaction information, and (2) a proposed change to the one or more data of the transaction information; prompting the participants of the blockchain to respond to the indication of the dispute by accepting or denying the proposed change; if one of the participants, other than the one or more participants from whom an indication of a dispute was received, denies the proposed change, executing a dispute settlement process to determine revised transaction information; and outputting the revised transaction information to the shared ledger.

In accordance with another embodiment, decentralized computer systems are disclosed for analyzing transaction attributes and dispute information using blockchain. The system comprises: a data storage device storing instructions for analyzing transaction attributes and dispute information using blockchain; a user interface; and a processor configured to execute the instructions to perform a method including: receiving a first transaction information of a first transaction for a good or service originating at a merchant, wherein the transaction information includes attributes of the transaction that comprises (1) an identifier of an issuer of a payment source account of a user for applying resources to the first transaction, (2) an identifier of an acquirer of a payment account of the merchant for depositing the applied resources for the first transaction, (3) the amount of resources to be applied to the first transaction, and (4) an identification of the good or service transacted; generating a blockchain entry that stores the received first transaction information to a shared ledger, wherein the shared ledger is accessible to participants of the blockchain comprising at least the issuer of the payment source account of the user and the acquirer of the payment account of the merchant, and wherein the shared ledger also stores transaction information of other transactions having one or more attributes shared by the first transaction; receiving, from the user interface, an input of a selection of one or more attributes of the first transaction from a participant of the blockchain to analyze other transactions having the one or more attributes shared by the first transaction; searching the shared ledger and compiling a list of other transactions having the selected one or more attributes shared by the first transaction; receiving transaction information for each transaction of the list of other transactions, wherein the transaction information includes attributes of the other transactions; and generating and displaying, on the user interface, an analytics report of the attributes of the other transactions having the selected one or more attributes shared by the first transaction.

In accordance with another embodiment, a non-transitory machine-readable medium is disclosed that stores instructions that, when executed by a blockchain server, causes the blockchain server to perform a method for analyzing transaction attributes and dispute information using blockchain. The method includes: receiving a first transaction information of a first transaction for a good or service originating at a merchant, wherein the transaction information includes attributes of the transaction that comprises (1) an identifier of an issuer of a payment source account of a user for applying resources to the first transaction, (2) an identifier of an acquirer of a payment account of the merchant for depositing the applied resources for the first transaction, (3) the amount of resources to be applied to the first transaction, and (4) an identification of the good or service transacted; generating a blockchain entry that stores the received first transaction information to a shared ledger, wherein the shared ledger is accessible to participants of the blockchain comprising at least the issuer of the payment source account of the user and the acquirer of the payment account of the merchant, and wherein the shared ledger also stores transaction information of other transactions having one or more attributes shared by the first transaction; receiving an input of a selection of one or more attributes of the first transaction from a participant of the blockchain to analyze other transactions having the one or more attributes shared by the first transaction; searching the shared ledger and compiling a list of other transactions having the selected one or more attributes shared by the first transaction; receiving transaction information for each transaction of the list of other transactions, wherein the transaction information includes attributes of the other transactions; and generating and displaying, on a user interface, an analytics report of the attributes of the other transactions having the selected one or more attributes shared by the first transaction.

In some embodiments, the non-transitory machine readable medium may be embedded into various nodes of the blockchain.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Figure 1:
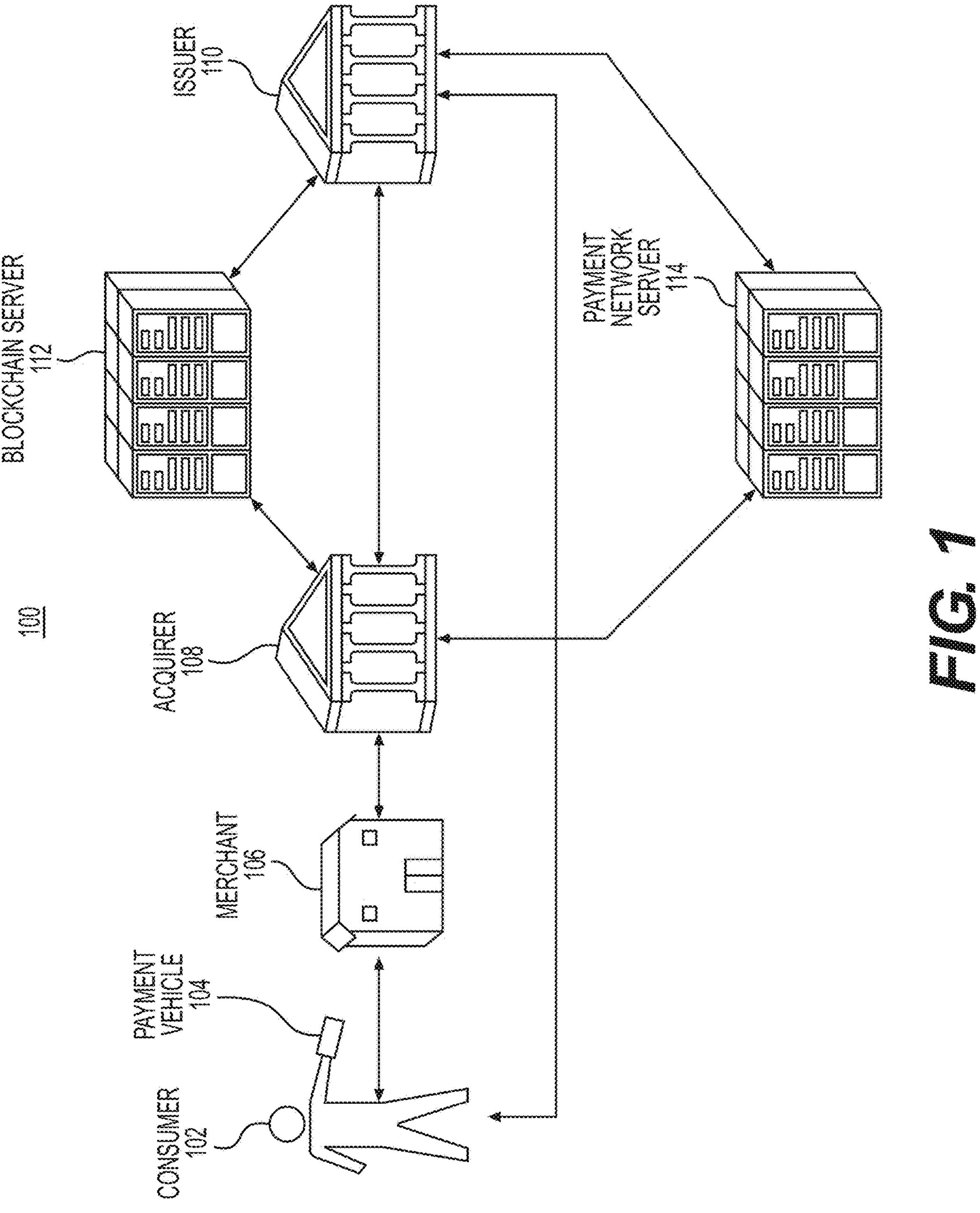
FIG. 1 depicts an environment of the blockchain dispute management system for payment transactions, in accordance with non-limiting embodiments.

Various non-limiting embodiments of the present disclosure will now be described to provide an overall understanding of the principles of the structure, function, and use of systems and methods disclosed herein for improving computer database efficiency of managing disputes in payment transactions using blockchain.

As described above, existing methods of resolving disputes in payment transactions, which use the payment network as a mediator, have proven to be complicated, lengthy, and cumbersome for issuers, consumers, merchants, and/or acquirers. Parties to a payment transaction may be burdened with making costly changes by having to comply with the frequent changes in payment networks and the rules used by the payment networks for resolving disputes.

Thus, the embodiments of the present disclosure are directed to a system and method for enabling consumers and their issuers to resolve disputes with merchants and their respective acquirers in a dispute resolution process that is efficient, transparent, and standardized (e.g., to account for multiple payment networks), reduces costs for parties, and minimizes risks and incidents of fraud. In various embodiments, a blockchain may refer to an open, distributed ledger (e.g., "shared permissioned ledger") that can record transactions between parties to a payment transaction efficiently and in a verifiable and a permanent way (e.g., by providing visibility or by being transparent to various participants of the blockchain). A blockchain may be operated by many different parties that come to share consensus. It may maintain a growing list of ordered records, called blocks. Each block may have a timestamp and a link to a previous block. Records may not be altered retroactively. A common analogy for a blockchain may be a digital network of safety deposit boxes. These boxes can secure any digital asset (e.g., currency, securities, loyalty points, contracts). Each box is locked with a crypto private key. The owner of the box can use their key to unlock the box and push a digital asset to another safety deposit box that is secured by the keys of the recipient. The recipient can then retrieve the digital asset from their safety deposit box.

A blockchain may include one or more of the following features. In some embodiments, a blockchain may include a database, and tabular schemes may be used to encode core data types on top of a traditional database. In such embodiments, tables may consist of blocks, which may be bundles of transactions. Furthermore, such embodiments may be configures so that blockchain transactions may be all or nothing. A blockchain may be rendered immutable, ensuring that the data stored cannot be changed. Each block in the chain may include reference to the previous block so in chains with a high rate of new transactions, the block becomes securely linked to previous blocks. The block may also be replicated numerous times. Cryptography may ensure that users of a blockchain may only edit the parts of the blockchain that they "own" by possessing the private keys necessary to write to the file. Cryptography may also ensure that copies of the distributed blockchain are kept in sync. Distributed ledgers ("shared ledgers") may be used for transaction integrity. Thus, ledgers may be maintained by multiple independent entities on different computing devices. A consensus protocol may be followed by each entity to maintain a consistent view of the ledger. Distributed ledgers provide for greater resiliency against malicious attacks or system failures. Furthermore, a blockchain may be "permissioned"—e.g., allow access to only a specific set of participants. It is contemplated that it may be useful for financial applications to use distributed, centralized, permissioned, tokenless ledgers as a basis for the implementations of various systems and methods presented herein.

Blockchain may have a long-term impact on the financial services industry in paring down transaction settlement time from days to minutes and minimizing the need for intermediaries. Furthermore, it may enable point-to-point exchanges of digital assets without a need for trust between the parties in the exchange. This eliminates the need for third party engagement in transactions and reduces the cost involved in verifying a transaction.

As applied to at least some embodiments presented therein, a blockchain having a shared permissioned ledger may be available to participants and may provide visibility to the participants of the blockchain, which may be the parties of a payment transaction initiated by a consumer and originating at a merchant. These parties may include, but are not limited to, the consumer, the merchant at which the transaction originates, the merchant's acquiring bank or institution, and the issuing institution or bank of the consumer. The ledger may be programmed to trigger transactions or resolve disputes based on the payment transaction automatically (e.g., via Smart Contracts). Thus, the use of the blockchain for dispute resolution for payment transactions ("blockchain dispute resolution") may result in efficiencies, reduced chargebacks, efficient allocation of resources, and reduction in costs for both issuers and merchants.

In some embodiments, if a blockchain dispute resolution process is unsuccessful in resolving a dispute (e.g., if one or more of the parties to the dispute indicate that they do not agree with the result of the blockchain dispute resolution) the payment network may take over in handling the dispute (e.g., via the traditional network dispute resolution process, referred to as "payment network dispute resolution" herein). Nevertheless, the blockchain dispute resolution process may be able to help address a large proportion of the disputes and/or chargebacks of payment transactions without the network intermediary, for example, if there exists a degree of trust between the participants in the dispute (e.g., consumers, issuers, merchants, acquirers, etc.).

It is contemplated that the blockchain dispute settlement process may eliminate the need for payment network dispute settlement, and thereby prevent the need for maintaining two dispute settlement systems for a potential dispute. In some embodiments, it is also contemplated that any dispute settlement may be confined to the blockchain dispute settlement process, e.g., to reduce the cost of having to maintain more than one dispute settlement systems.

In some embodiments, the participants of the dispute may be represented as nodes of a blockchain and/or may be able to access and/or contribute to the blockchain. Unlike network dispute resolution process, which may rely on a centralized authority (e.g., a payment network), a blockchain dispute resolution process, e.g., as described by various embodiments of the present disclosure, may facilitate a transparent, rules-based, communication process to reduce costs for both merchants and acquirer.

The types of blockchain systems used for dispute management for payment transactions may include, for example, public blockchains, private blockchains, or a hybrid form of a public and private blockchain (e.g., a consortium blockchain or hyperledger blockchain). In a consortium blockchain, the consortium may include and be accessible to the participants of the blockchain (e.g., consumers, issuers, merchants, and/or acquirers of a payment transaction). A consortium blockchain may proffer the benefits of setting control of the rules for dispute settlement within the bounds as agreed upon by the participants. Thus, the rights to read and/or access the blockchain may be restricted to different participants, based on individual classes or identities of the participants.

In some embodiments, the participants of a blockchain, prior to joining the blockchain, may be vetted, and hence may not be anonymous participants. Vetting may minimize the risk of any form of malicious attacks on the blockchain. In other embodiments, the new entrants to a blockchain may be restricted to those known by other known participants of the blockchain. These blockchains (e.g., a consortium blockchain) may eliminate and/or significantly reduce the risks of attacks that are prevalent, for example, in public blockchains (e.g., 51% attack). The risks may be eliminated and/or significantly reduced due to restrictions placed on the entry of new members. The transactions may resemble the "colored pin" approach of transferring ownership to different participants in the blockchain. It may also be efficient to use certain blockchains (e.g., consortium blockchains) due to the limited number of nodes that may need to be updated and the limited role of verifying the blocks before those are appended to the blockchain. The members or participants of the blockchain may be represented as nodes of the blockchain. In some embodiments, for example, where the nodes may be "trusted" and/or be well connected, a blockchain may enable the nodes to easily spot and/or fix any failures or inconsistencies of the blockchain. For example, in a consortium blockchain, payment transactions and/or dispute resolution processes caused by the payment transactions may be many degrees cheaper compared to their implementation on a public blockchain. Additionally or alternatively, a blockchain may be used that may provide flexibility to develop on the blockchain infrastructure. For example, a hyperledger (or hyper ledger or hyper-ledger) may be specifically built to expand to other non-traditional use-cases of the blockchain. Since verification may be needed by a comparatively larger number of nodes in the public blockchain as compared to a consortium or private blockchain, a public blockchain may require a high level of computational power than a consortium or private blockchain.

In some embodiments, the blockchain dispute resolution process may involve a Smart Contracts application. In various embodiments, "Smart Contracts" may refer to a computerized transaction protocol that facilitates, verifies, and/or enforces the negotiation or performance of a contract (e.g., as the one governing a payment transaction between the issuer and the merchant or merchant's acquirer). A Smart Contract may satisfy common contractual conditions (e.g., payment terms, liens, confidentiality, enforcement, etc.), minimize malicious and/or accidental exceptions, and/or minimize the need for trusted intermediaries. Different types of algorithms may be employed to offer finality (e.g., of a contract) in a shorter timeframe. Various rules for initiating or managing the dispute settlement between parties can be "codified" into the smart contract between the participants. In some embodiments, once the rules have been "codified" into the blockchain, the rules of the Smart Contracts may be rendered or configured to be final and/or immutable during its execution of the Smart Contract. Furthermore, the blockchain may serve as an audit trail for the dispute for the participants, should questions arise as to the dispute settlement process.

For example, the blockchain dispute resolution process may be governed and/or at least initialized using Smart Contracts. Participants of the dispute resolution process (e.g., consumers, issuers, merchants, acquirers, etc.,) may establish the underlying attributes of the contract governing the payment transaction, or the underlying rules of the dispute resolution process. Smart Contracts may then proceed to execute the payment transaction based on the underlying attribute values or facilitate the dispute resolution process using the underlying rules.

In some embodiments, cryptographic assurances may be available to the participants. Any documents may be captured and securely stored by the blockchain, for example, in an off-the-blockchain storage (e.g. NoSQL database), for retrieval by the other party. Identifiers to these documents may be stored in the blockchain. These documents may include, for example, receipts of purchases, identification information of the consumer, merchant, issuer, or acquirer, available funds or resources, geographical information, or temporal information.

In further embodiments, user interface systems and methods are disclosed for analyzing the various data stored in the blockchain. The various data may include information regarding a specific attribute(s) of a transaction (e.g., other transactions that share the same attribute(s)). In some embodiments, one or more of the specific attribute(s) that is being analyzed may be in dispute in the original transaction. The attributes may include, for example, a party to the transaction or transaction dispute, and such embodiments may also be able to provide analytical data on that party (e.g., transaction history of that party, incidents of fraud that resulted from that party, etc.)

One or more examples of these non-limiting embodiments are illustrated in the selected examples disclosed and described in detail with reference made to FIGS. 1-3 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts an illustration of the environment for the blockchain dispute management system for payment transactions, in accordance with non-limiting embodiments. At a high level, the environment for the blockchain dispute management system 100 comprises: a consumer 102 equipped with a payment vehicle 104 from an issuing bank or institution, i.e., "issuer" 110; a merchant 106 with an acquiring bank or institution, i.e., "acquirer" 108; a blockchain dispute management server 112 ("blockchain server") or computing system; and a computing system or server 114 ("payment network server") for a payment network used in the transaction. However, in some embodiments, it is contemplated that the blockchain dispute settlement process described herein may eliminate the need for the payment network server 114 for settling disputes. In various embodiments of the present disclosure, the acquirer 108 and the issuer 110 may also refer to the computing system or server of the acquirer 108 or issuer 110, respectively.

Various embodiments of the present disclosure may involve the consumer 102 conducting a payment transaction with merchant 106 using a payment vehicle 104, e.g., a credit card, debit card, mobile device, or the like. It will be appreciated by those of skill in the art that consumer 102 may present payment vehicle 104 at a POS terminal of merchant 106 to initiate a payment transaction. However, in some embodiments, there may be an online portal of a merchant for the consumer to initiate a payment transaction in lieu of a physical POS terminal. Upon initiation of the payment transaction by a consumer, the merchant and/or the POS terminal of the merchant may transmit transaction information to the acquirer 108 of the merchant. The transaction information may include, for example, information identifying the issuer 110 of the payment vehicle 104 of the consumer 102. The acquirer 108 may transmit the transaction information to the issuer 110, and request payment of funds, in accordance with the terms of the transaction.

The issuer 110 may dispute one of the terms of the transaction, e.g., the amount of funds required, the type of purchase made, the payment vehicle used, etc. If there is a disagreement between the acquirer 108 (or merchant 106) and the issuer 110 (or consumer 102) as to the terms of the transaction, one or more of the disputants (e.g., acquirer, issuer, merchant, or consumer) may relay information related to the dispute ("dispute information") to the blockchain server 112. The dispute information may be encrypted and entered into a blockchain where the disputants may be members (e.g., nodes), and therefore may be able to read and/or access each block of the blockchain. The blockchain server 112 may attempt to resolve the dispute using at least some of the methods described in the present disclosure. The blockchain server 112 may present the dispute resolution to the disputants (e.g., acquirer, merchant, issuer, consumer, etc.). The dispute resolution may itself be another entry into the distributed ledger of the blockchain, which the members of the blockchain may be able to read and/or access. In some embodiments, if one or more of the disputants do not agree with the dispute resolution presented by the blockchain server, the dispute information may be relayed to the payment network server 114 to resolve the dispute. In such embodiments, the payment network server may adjudicate the dispute according to traditional dispute settlement processes. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

Figure 2:
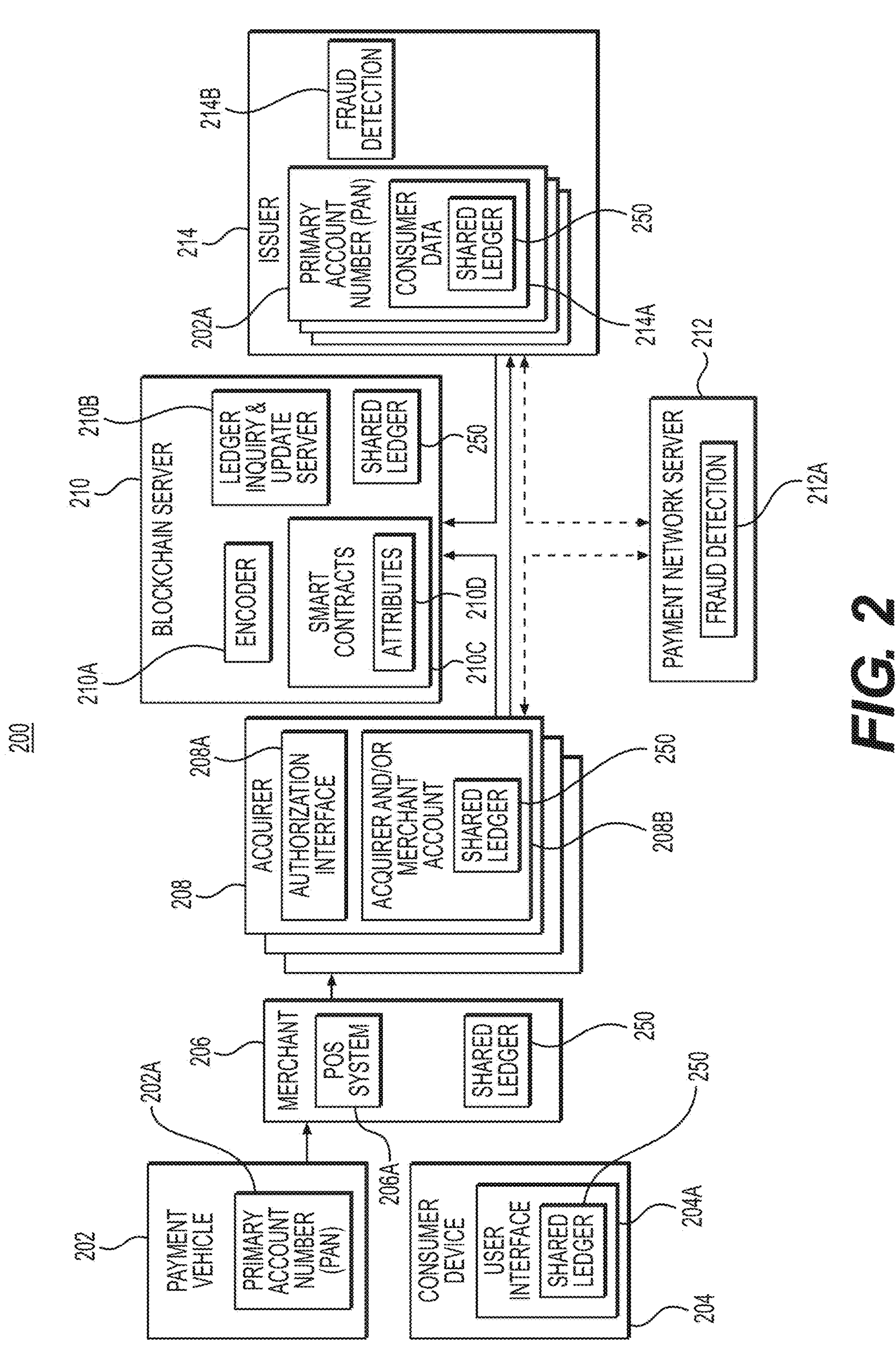
FIG. 2 depicts a block diagram of an example network of the blockchain dispute management system for payment transactions, in accordance with non-limiting embodiments.

FIG. 2 depicts a block diagram of an example network 200 of the blockchain dispute management system for payment transactions, in accordance with non-limiting embodiments. Specifically, the network includes the payment vehicle 202 of a consumer, a consumer device 204 of a consumer, the merchant 206, the acquirer 208, a server that manages payment transaction disputes using ("blockchain server") 210, the payment network server 212, and the issuer 214. It is contemplated, however, that in some embodiments, the blockchain dispute settlement process may even eliminate the need for the payment network server 212 in resolving disputes.

The payment vehicle 202 may be linked with a financial account of resources or funds defined by a primary account number ("PAN") 202A. In one embodiment, the PAN may identify one or more payment source accounts of the consumer, issued or established by a given issuer 214. Unless otherwise specified herein, a payment vehicle may include a physical card including a plastic or metallic card having a magnetic stripe, bar code, or other device or indicia indicative of an account number or other account information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. It is also contemplated that the payment vehicle 202 may have multiple embodiments or forms. For example, payment vehicle 202 can be a physical card (e.g., in the form of magnetic striped plastic card), a virtual card (e.g., in the form of a display on a smart phone), or both. The virtual card may be communicated by displaying a display or screen shot, and/or by transmitting a signal, such as by using NFC (Near Field Communication) technology or other secure transport technologies to complete the transaction with the selected merchants. Optionally, the virtual card may have a display element (e.g., a bar code or string of numbers) which identifies the account number (e.g., PAN) associated with the card. Alternatively, the virtual card may have display elements relating to the merchants that accept the card.

A consumer, sometimes referred to as the end user, a cardholder, or a card member, may provide identifying information, e.g., via the PAN 202A of the user, to the POS system 206A of the merchant 206 to initiate a transaction with merchant 206 using the consumer's payment vehicle 202 (e.g., an enrolled credit card). In some cases, the consumer may use a computing device or mobile device ("consumer device" 204) to initiate the transaction, such as for a card-not-present transaction at an online merchant. Thus, payment vehicle 202 may enable the consumer to initiate a transaction with merchant 206 using the payment source associated with the issuer 214 that issued the payment vehicle 202 to the consumer. A consumer may also use the consumer device 204 to oversee, manage, or access details regarding a payment transaction via user interface 204A. Transaction details may be accessible to the consumer via a shared ledger 250, which the consumer may access via the user interface 204A of consumer device 204. Thus, during a dispute settlement process mediated by the blockchain server 210, a consumer may view the results of a dispute settlement process posted on the shared ledger 250 using the user interface 204A of consumer device 204. A consumer may also use the consumer device 204 to initiate a dispute and/or have a computing system of issuer 214 initiate a dispute based on information presented via user interface 204A.

In various embodiments described herein, a merchant 206 may refer generally to any type of retailer, service provider, or any other type of business that is in networked communication with the computing system of an acquiring institution or bank ("acquirer" 208) and uses the payment processing services of acquirer 208. Payment processing services may include receiving and responding to authorization requests as well as facilitating the settlement of funds associated with card-based transactions occurring at merchant 206. In some embodiments, as described herein, the acquirer 208 may use the blockchain server 210 to facilitate the settlement of funds associated with the card-based transactions occurring at merchant 206. A merchant 206 may have one or more POS systems 206A. In various embodiments described herein, a POS system 206A may refer broadly to include POS systems at brick and mortar locations and "virtual" POS systems that can be associated with online retailors or "in-app" purchases. In some cases, a POS system 206A may include a physical terminal, or other network computing system used to facilitate a payment transaction at a location of merchant 206. Each POS system 206A may be generally unmodified or "stock" and simply facilitate the standard transmission of transaction-related information to the acquirer computing system 208, as is known in the art. The transaction-related information may comprise a transaction authorization request ("authorization request"), including but not limited to, a payment amount, a date, a time, a primary account number, as well as other types of identifying indicia (e.g., merchant identification). The identifying indicia may vary based on POS system 206A, the type of merchant, and the type of transaction, but example types of identifying indicia may include any of the following: an alternative identifier to the primary account number of the user; a user's name or other user identifier; a merchant identification (MID) identifier; a merchant category code (MCC) identifier; a media access control (MAC) identifier; an internet protocol (IP) identifier; a geographic identifier; and/or a payment type identifier. In some embodiments, as described herein, a merchant 206 may also be able to oversee, manage, and/or access details regarding a payment transaction originating at the merchant 206, via a shared ledger 250. For example, during a dispute settlement process mediated by the blockchain server, a merchant may view the results of a dispute settlement process posted on the shared ledger 250. A merchant 206 may also initiate a dispute and/or have the acquirer computing system 208 initiate a dispute, and have the blockchain server 210 and/or payment network server 212 facilitate the dispute.

Referring now to acquirer computing system 208, authorization interface 208A may receive a transaction authorization request from POS system 206A of merchant 206. The authorization request may comprise various data, including, for example, a MID, a MCC, the cardholder's primary account number 202A, and a transaction amount, among other things. In some embodiments, acquirer computing system 208 may also receive other consumer-identification related data, e.g., an email address, an IP address, etc. In yet another embodiment, the transaction authorization request detail may contain identifying information about the merchant. Once the authorization request is received, acquirer computing system 208 may transmit the transaction authorization request, including the amount of funds required for the transaction ("transaction amount") and the primary account number 202A of the user, received from POS system 206A, to payment network server 212 for further processing of the payment transaction. In some embodiments, a component of acquirer computing system 208 (e.g., authorization interface 208A) may also transmit data identifying the acquirer (e.g., the identifying information of the acquirer bank) to payment network server 212. In other embodiments, a merchant 206 may directly transmit the payment authorization request to payment network server 212 for further processing of the payment transaction.

Still referring to FIG. 2, once the transaction authorization request is delivered to payment network server 212, the transaction authorization request may be processed according to methods known to those having ordinary skill in the art. For example, payment network server 212 may store the transaction related information and route the payment authorization request to the issuer to request funds to complete the transaction. In some embodiments, the payment network server may also extract funds from one or more of the merchant, acquirer, or the issuer, for the payment network that serves as an intermediary for the transaction. Traditionally, when disputes arise concerning information of a payment transaction, the payment network used for the payment transaction provides a means for the dispute resolution ("payment network dispute resolution"), e.g., via payment network server 212. Often during the payment network dispute resolution, a server, application, or department of one of the various entities described in FIG. 2 (e.g., fraud detection 214B of issuer 214) may investigate the payment transaction for possible fraud. In some embodiments, the participants of the dispute may resort to the payment network server for resolving disputes if the participants cannot agree to the results of a dispute resolution process mediated by blockchain dispute management server 210 ("blockchain dispute resolution"). In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

In various embodiments described herein, an issuer 214 may refer to an institution or organization that issues a payment vehicle 202 to the consumer or to the computing system of the institution or organization. The issuer 214 may enable the consumer to use funds from a payment source held by the issuer. For example, the issuer 214 may be the bank of the consumer, which stores the consumer's checking and savings account. In some embodiments, an issuer may utilize an issuer computing system to receive and transmit various transaction-related information (e.g., receive transaction authorization request from the acquirer). After receiving a transaction authorization request, an issuer may use the primary account number (PAN) 202A associated with the transaction authorization request to locate data regarding a consumer ("consumer data" 214A). The consumer data 214A may include, for example, the account balance of the consumer, and/or a designated account to be used for the transaction. In one embodiment, at least some of the consumer data as it pertains to a payment transaction may be stored in a shared ledger 250 of a blockchain, where the participants of the blockchain include the parties involved in the payment transaction (e.g., consumer, merchant, issuer, acquirer, etc.). In some embodiments, the transaction authorization request made by the acquirer may itself be a block in a blockchain, accessible to the issuer (and other participants of the blockchain) on the shared ledger 250. In some embodiments, the blockchain may assist in the storage of fraud information related to current and/or or prior transactions related to the consumer, merchant, issuer, and/or acquirer. In such embodiments, before a transaction authorization request is initiated, a participant of the blockchain (e.g., acquirer) may check the blockchain for any records of fraud related to the PAN or identifying information related to a party of the transaction, and then may deny the transaction (e.g., based on possibilities of fraud). The issuer, 214, using, fraud detection 214B, may be useful in providing fraudulent data to the blockchain so that parties to a transaction may collaboratively resolve a dispute, should a dispute arise. In some embodiments, a fraud detection application, department, or interface may be located at the payment network server 212 (e.g., fraud detection 212A).

Once the funds are withdrawn, a new entry may be published in the blockchain so that participants of the blockchain (e.g., merchant, acquirer, consumer, issuer, etc.) may be informed. For example, after any block providing information regarding one or more attributes of a payment transaction has been published in the blockchain, one or more participants of the blockchain may dispute the accuracy of the information presented. Thus, a dispute may be initiated by one or more participants of the blockchain at any point in the payment transaction process.

The blockchain dispute management server 210 may oversee the dispute resolution process when one or more participants of the blockchain disputes any data about an attribute of the payment transaction ("transaction information") posted on the shared ledger 250. The attributes may include, but are not limited to: the identity of the merchant, consumer, acquirer, or issuer of the payment transaction; the transaction amount; an itemization and description of the goods and/or services transacted for; any geographical and/or temporal information of the payment transaction; any taxes, any tips, any discounts; any fees directed towards acquirers, issuers, payment networks; currency exchange rates; etc. In some embodiments, any data (e.g., value, name, etc.) for an attribute of the transaction information posted to a blockchain may be encrypted using encoder 210A, for example, to provide security and/or protect sensitive information. Data stored for these attributes may be quantitative (e.g., an amount) and/or qualitative (e.g., name of merchant). In some embodiments, metadata may also be stored. A ledger inquiry and update interface 210B may be one or more of an application, application program interface, software, hardware, server, or protocol that allows the addition of data (e.g., a new attribute or a detail regarding an attribute for the payment transaction or dispute, a proposed modification of the attribute by a disputing party, etc.) to a blockchain and/or shared ledger 250. In some embodiments, ledger inquiry and update interface 210B may further enable the access or retrieval of data for any attribute of the transaction information from the shared ledger 250. Thus, ledger inquiry and update interface 210B may respond to requests to add attributes of a payment transaction, dispute one or more of the previously posted data for a transaction attribute, adding a proposed modification to an existing transaction attribute (e.g., for initiating a dispute) or to a data of an existing transaction attribute, and/or search for or retrieve details regarding a transaction attribute (e.g., data stored for the attribute).

The Smart Contracts 210C may be one or more of an application, application program interface, software, hardware, server, or computerized transaction protocol that facilitates, verifies, and/or enforces the negotiation or performance of a contract. In various embodiments presented herein, the contract is configured to govern the payment transaction between the issuer and the merchant or merchant's acquirer. The terms of the contract may be set, for example, by the attributes 210D of the payment transaction as posted to the blockchain, and/or by predetermined rules governing the performance of the contract or dispute resolution. Participants of a dispute resolution process (e.g., consumers, issuers, merchants, acquirers, etc.,) may establish the underlying attributes 210D of the contract governing the payment transaction, and/or the underlying rules of the dispute resolution process, e.g., at the time the participants become members of the consortium. Smart Contracts 210C may then proceed to execute the payment transaction based on the underlying attributes 210D (and their values) or facilitate the dispute resolution process using the underlying rules. After a blockchain dispute resolution process is performed, the results may be posted to the shared ledger 250, for participants of the blockchain (e.g., the parties to the payment transaction) to view. A party may not agree with the results, and may therefore reinitiate or represent a dispute. A dispute may be settled when both parties agree on the liability. There may be sophisticated rules that govern the settlement in the case both the parties do not agree or if there is a stalemate. For example, the parties may agree to split the liabilities in the case of a disagreement. Furthermore, fraudulent transactions and/or card-not-present (CNP) transactions may be prevented since a merchant or an acquirer may be able to look up this additional information in the blockchain to deny the transaction. In some embodiments, traditional methods of dispute resolution (e.g., payment network dispute resolution) may be relied on after one or more unsuccessful blockchain dispute resolution processes.

Figure 3:
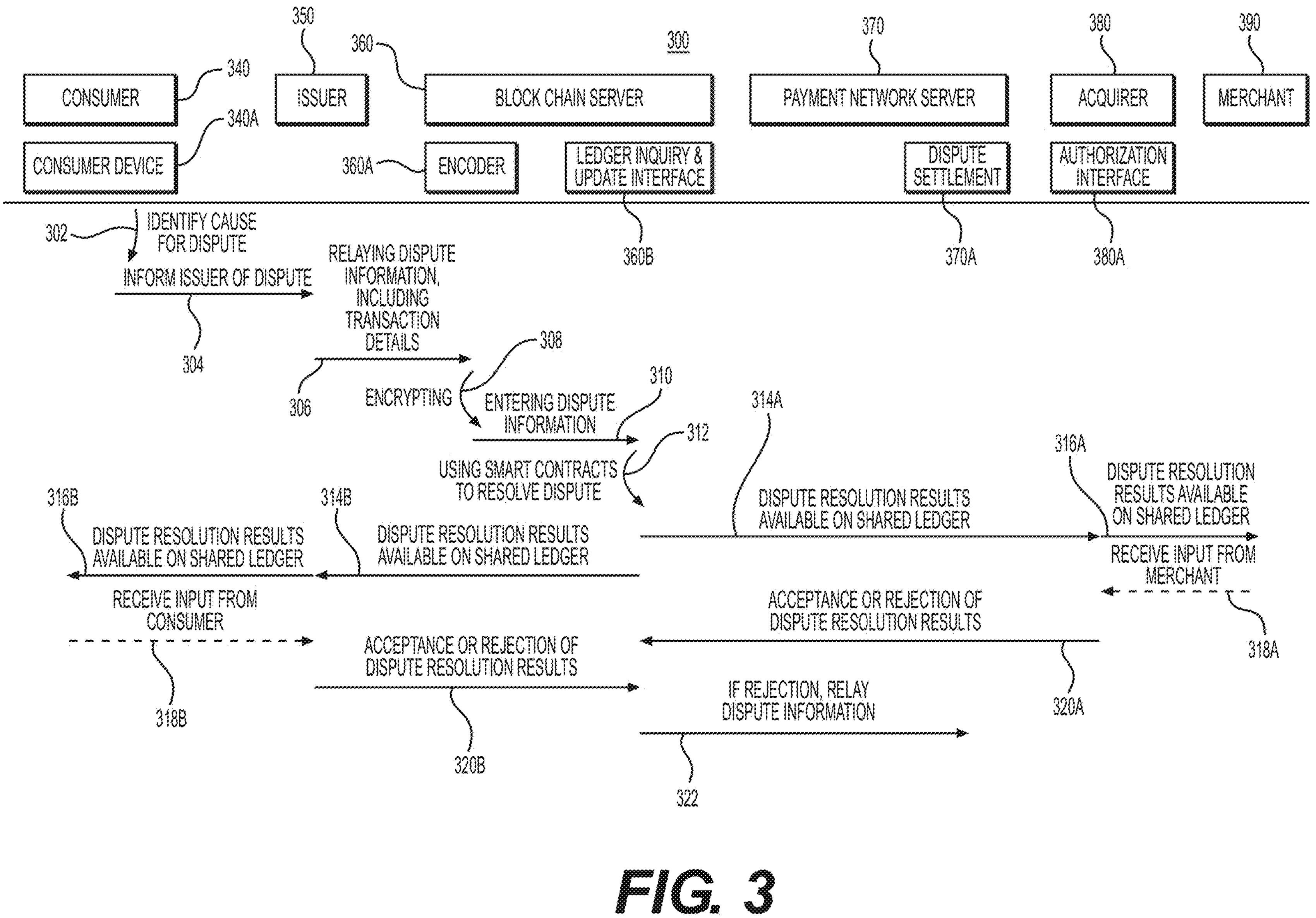
FIG. 3 depicts a simplified sequence flow diagram of a method for improving computer database efficiency of managing disputes in payment transactions using blockchain, in accordance with non-limiting embodiments.

FIG. 3 depicts a simplified sequence flow diagram of method 300 for improving the efficiency of managing disputes in payment transactions using blockchain, in accordance with one non-limiting embodiment. Method 300 may be executed by the devices and/or components related to the consumer 340 (e.g., consumer device 340A), the issuer 350, the blockchain dispute management system ("blockchain server") 360 (e.g., encoder 360A, ledger inquiry and update interface 360B, etc.), the payment network server 370 (e.g., dispute settlement system 370A, etc.,), the acquirer 380 (e.g., authorization interface 380A), and the merchant 390. As explained in FIG. 2, a shared ledger (e.g., as in 250 in FIG. 2) may be accessible to participants of the blockchain, for example, the consumer 340 (via consumer device 340A), the issuer 350, the acquirer 380, and the merchant 390.

In process flow 302, a consumer may identify a cause for a dispute. For example, a consumer may browse the consumer's bank statements using the consumer device to discover that the consumer was charged or is being charged more than what was transacted for in a payment transaction originating at a merchant. Thereafter, in process flow 304, the consumer may inform the issuer (e.g., consumer's bank) of the dispute.

In process flow 306, the issuer may relay dispute information, including transaction information and the disputed attributes of the transaction, to the blockchain dispute management system. Alternatively or additionally, the dispute may be initiated by the issuer. For example, an issuer may receive transaction related information from an acquirer in a transaction authorization request. An issuer may also receive transaction related information by other means, for example, by the consumer, or via saved records of past transactions originating at the merchant. An issuer may initiate a dispute if there is an inconsistency between the transaction related information received from one or more sources. It is contemplated that in some embodiments, transaction related information may be accessible to the issuer via a shared ledger 250, as part of a blockchain.

In some embodiments, as shown in process flow 308, the blockchain dispute management system may encrypt the received dispute information using, e.g., an encoder 360A. The encryption may protect sensitive information of the consumer or merchant, and/or restrict the accessibility of the information.

At process flow 310, the blockchain dispute management system may enter the encoded dispute information into a shared ledger 250. The dispute information may include one or more attributes of the disputed payment transaction originating at the merchant and initiated by the consumer. The attributes of the payment transaction may include, but are not limited to, e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; etc. The encoded dispute information may further include, but is not limited to: an identification of one or more of the attributes that is in dispute, an identification of the disputant, the disputant's proposed modification to the disputed attribute, and geographical and/or temporal information of the dispute.

In some embodiments, process flow 310 may be performed by a ledger inquiry and update server. A ledger inquiry and update interface may be one or more of an application, application program interface, software, hardware, server, or protocol that allows the addition of information (e.g., an attribute of the payment transaction, a proposed modification of an attribute by a disputing party, etc.) to a blockchain and/or shared ledger. In some embodiments, the ledger inquiry and update interface may further enable the access or retrieval of information from the shared ledger. Thus, the ledger inquiry and update interface may respond to requests to add attributes of a payment transaction, dispute one or more of the previously posted transaction attributes, adding a proposed modification to an existing transaction attribute (e.g., for initiating a dispute), and/or search for or retrieve details regarding a transaction attribute. The ledgers and/or subledgers of the blockchain dispute settlement system may be continually updated, and may be updated to reflect accurate details regarding the payment transaction between participants of the blockchain. Thus, the merchant involved in the disputed payment transaction, the acquirer for the merchant, the consumer initiating the payment transaction, and the issuer for the merchant, as participants, may be able to access the blockchain or, confirm the accuracy of the payment transaction details. If one of the participants disputes the accuracy of a posted transaction attribute, the participant may initiate the process of entering the disputed information into the blockchain (e.g., as in process flows 302-310). The ledger may be updated and/or new details may be posted by adding blocks to the blockchain using pre-defined rules, e.g., agreed on by the participants of the blockchain. In other embodiments, the ledger may be updated and/or new details may be posted, using block chain mining methods known to persons having skill in the art.

In process flow 312, the blockchain dispute management system may resolve the dispute related to one or more attributes of the payment transaction using the predetermined rules for dispute resolution. In various embodiments of the present disclosure, attributes of the payment transaction may refer to, for example, details related to a payment transactions (e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; currency exchange rates; etc.). The rules of the dispute resolution may refer to procedures used for interpreting the transaction attributes, obtaining information related to the dispute, and resolving the dispute. In some embodiments, process flow 312 may be performed using Smart Contracts, or any computerized transaction protocol that facilitates, verifies, and/or enforces the negotiation or performance of a contract (e.g., as the one governing the payment transaction between the issuer and the merchant or merchant's acquirer). The predetermined rules for the dispute resolution may be set and/or agreed to by participants of the blockchain. For example, the acquirer and the issuer may agree to use certain methods of calculating prices. In another example, the participants may agree that if the issuer approved a transaction that was associated with a fraudulent account, the issuer will not have the right to initiate a chargeback. Participants may enact rules to check for invalid disputes related to fraud, e.g., if the fraud type and the conditions do not match, for example, if the fraud type is a counterfeit fraud but the conditions indicate a theft. Participants may agree to rules to initiate settlement real-time using the blockchain infrastructure to initiate payments. Furthermore, participants may also agree that if the dispute reason is a certain category, e.g., a fraud or an authorization decline, the liable parties may be automatically assigned based upon agreed-upon electronic contracts/rules which use the data in the blockchain to assign liability and may directly initiate settlement if, for example, there is not a trace of doubt in the liable party. In some embodiments, the rules for the dispute resolution may be set by the blockchain dispute management system according to industry standards. In other embodiments, the rules for the dispute resolution may be borrowed from the rules used by various payment networks for the management of disputes.

In some embodiments, the blockchain dispute resolution outputs results by publishing resolved attributes of the payment transaction into the blockchain. For example, a dispute may be initiated by a merchant who does not agree with a transaction amount contained within a transaction authorization request that is published in a ledger shared by participants of the blockchain (parties to a payment transaction). After the blockchain dispute resolution, the results may include a new block published in a shared ledger of the blockchain, which posts a corrected transaction amount to be deducted from the consumer's payment source.

In process flow 314A, 314B, 316A, and 316B, the results of the dispute resolution may be available to the issuer, acquirer, consumer, and merchant, respectively, via the shared ledger. In some embodiments, the results and/or process of the dispute resolution may be published in the blockchain, which may be readily available to the participants of the blockchain (e.g., issuer, acquirer, consumer, merchant, etc.).

At process flow 320A, the acquirer may accept or reject the results of the dispute resolution, as mediated by the blockchain dispute management system. Likewise, at process flow 320B, the issuer may accept or reject the results of the dispute resolution, as mediated by the blockchain dispute management system. Process flows 320A and 320B may involve prompting the acquirer and/or issuer, respectively, to respond to the results of the blockchain dispute resolution process, as published in the blockchain. In some embodiments, the acceptance or rejection of the dispute resolution results may be based on the input of the merchant or the consumer (e.g., as in process flows 318A and 318B, respectively). The consumer may view the results of the dispute resolution process as posted on a ledger shared with other participants of the blockchain using, for example, a consumer device. Likewise, the merchant may view the results of the dispute resolution on the same shared ledger, using, for example, the merchant's computing system. If one or more of the participants are not satisfied with the results of the blockchain dispute resolution process, the one or more participants may be able to notify the blockchain that they disagree with the results ("rejection"), and may also enter further information regarding the continued dispute. Like process flow 306, the one or more participants that are unsatisfied with the blockchain dispute resolution results may enter various dispute information, including, for example, any attributes of the resolved payment transaction that the one or more participants still disputes. For example, after viewing the results of the blockchain dispute resolution, as determined in process flow 312, a merchant (or its issuer) may still not agree with the corrected transaction amount to be deducted from the consumer's payment source to pay for the payment transaction. The merchant (or its issuer) may inform the blockchain management dispute system of its rejection of the results, and submit new dispute information, including the transaction amount that the merchant (or its issuer) believes to be correct. The blockchain dispute management system may use the received dispute information, including the new proposed attributes of the payment transaction, to initiate and resolve a new dispute. Thus, process flows 308 through 320A-B may be repeated until the participants agree to the results of the blockchain dispute resolution. In some embodiments, there may be rules that provide bounds on the number of times a dispute can be re-initiated. It is contemplated that in such embodiments, the smart contract rules may be configured to be at least sufficiently inclusive and versatile to handle multiple different dispute scenarios to prevent or minimize the possibility of failed dispute resolutions.

Alternatively or additionally, at process flow 322, if one or more of the participants indicate that they are still unsatisfied with the results of the blockchain dispute resolution, and present further dispute information, the blockchain dispute management system may relay the dispute information to the payment network system. In such embodiments, the payment network to resolve the dispute according to conventional methods as known to those having ordinary skill in the art. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

In some embodiments, the results of a dispute settlement may be readily available to the issuer, acquirer, consumer, and merchant, as participants in a blockchain, via a shared ledger that may be viewed, for example on a consumer device or computing system. In such embodiments, the results and/or process of the dispute resolution may be published in the blockchain, which may be readily available to the participants of the blockchain (e.g., issuer, acquirer, consumer, merchant, etc.).

In one or more embodiments, the published records of transaction information and dispute information may be periodically or continually retrieved and stored in computing systems that may be participants of the blockchain. The stored transaction information and dispute information may be periodically or continually analyzed to generate information (e.g., data analytics) that may be useful to other participants of the blockchain.

Figure 4A:
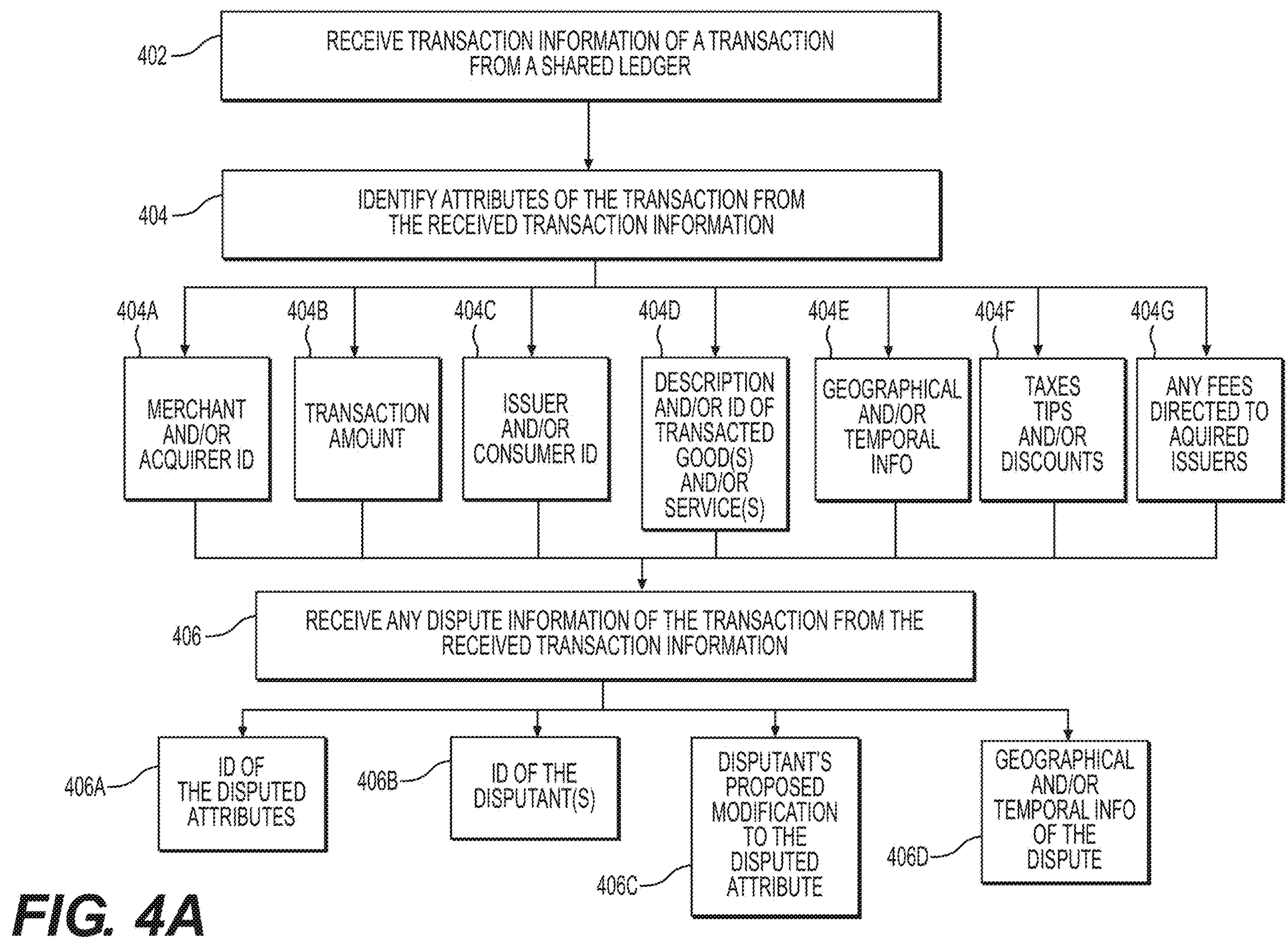
FIGS. 4A-4B depict block diagrams of a general method of analyzing data of a system for managing disputes in payment transactions using blockchain, in accordance with non-limiting embodiments.
Figure 4B:
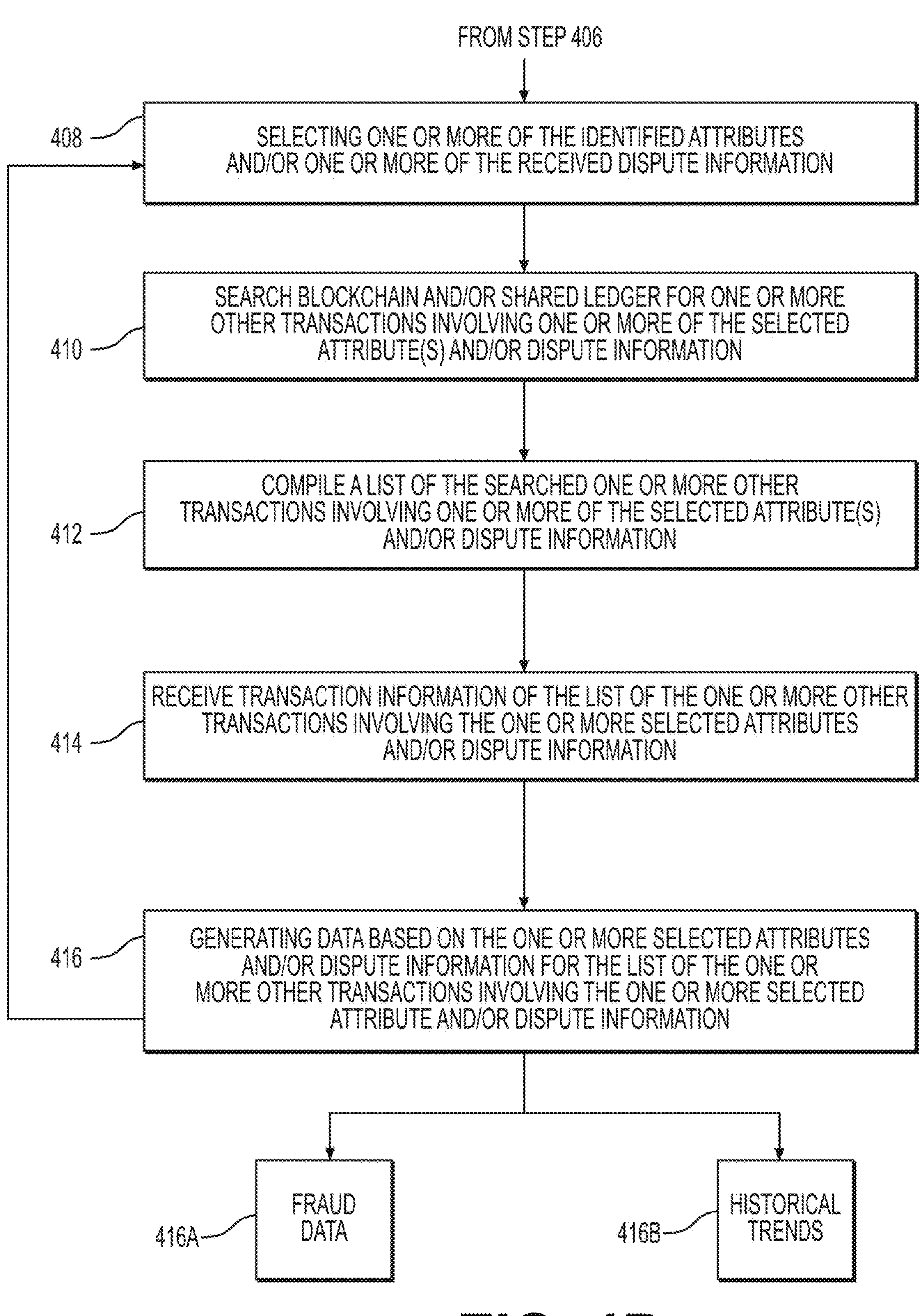

FIGS. 4A-4B depict block diagrams of a general method 400 of analyzing data of a system for managing disputes in payment transactions using blockchain, in accordance with non-limiting embodiments. Method 400 may be performed by a computing system and/or server that may be a participant or be able to access a blockchain or shared ledger and retrieve transaction information of transactions and/or dispute information regarding dispute settlement processes involving the transactions.

Step 402 may include receiving transaction information of a transaction from the shared ledger. In order to receive the transaction information, the computing system or server performing step 402 may be a participant of the blockchain or shared ledger in which the transaction information has been encrypted or stored (e.g., in a block). The transaction information may include various attributes of the transaction, which may be identified in step 404. For example, the attributes of the transaction may include, but are not limited to, e.g., an identification of the merchant and/or acquirer (e.g., merchant and/or acquirer ID 404A), the transaction amount(s) of one or more transacted good(s) or service(s) 404B, an identification of the issuer and/or consumer (e.g., issuer and/or consumer ID 404C), a description and/or identification of the transacted good(s) and/or service(s) 404D, geographical and/or temporal information of the transaction 404E, any taxes, tips, and/or discounts 404F; and any fees directed to the acquirer or issuers 404G (e.g., markup fees, interchange fees, etc.).

Alternatively or additionally, step 406 may include receiving any dispute information of the transaction from the shared ledger. Like step 402, in order to receive the dispute information, the computing system or server performing step 402 may be a participant of the blockchain or shared ledger in which the dispute information has been encrypted or stored (e.g., in a block). The dispute information may include, but are not limited to: an identification of one or more of the attributes that is in dispute 406A, an identification of the disputant(s) 406B, a disputant's proposed modification to the disputed attribute 406C, and geographical and/or temporal information of the dispute 406D. It is contemplated, however, that there may not have been any disputes for some transactions whose information may be stored in and/or published in the shared ledger, and for whom transaction information may be received in step 402. In such embodiments, step 406 may not be performed.

Step 408 may include selecting one or more of the identified attributes and/or one or more of the dispute information, e.g., for further analysis. In some embodiments, the selection may be made on the basis of a user input. For example, a user (e.g., a fraud prevention service) may be interested in knowing more about the disputant to a transaction. In such an example, the user may input the selection of the disputant in the computing system performing method 400 to determine, e.g., whether the disputant in a transaction has a history of initiating frivolous disputes in other transactions.

Step 410 may include searching a blockchain and/or a shared ledger for one or more other transactions involving one or more of the selected attribute(s) and/or dispute information. For example, a user may want to know other transactions involving the same disputant as the transaction whose information was received in step 402. In another example, a user may want to know other transactions involving the same good and/or service transacted for in the transaction whose information was received in step 402. The searched blockchain and/or shared ledger may be the same as that from which the transaction information was received in step 402. Alternatively or additionally, the searched blockchain and/or shared ledger may be different, or may involve different participants.

Step 412 may include compiling a list of the searched one or more other transactions involving the one or more selected attribute and/or dispute information.

Step 414 may include receiving transaction information for the one or more other transactions involving the one or more selected attribute or dispute information. For example, if the transaction information received in step 402 involved a transaction of an airline flight, and a user had selected (via user input) to receive more information about other transactions involving the same airline flight, step 414 may include receiving transaction information (e.g., attributes) of the other transactions involving the airline flight. Each of the other transactions may have its own transaction information with its own set of attributes. For example, the user may be able to know of other merchants, consumers, issuers, and/or acquirers involved in the airline flight purchase, transaction amounts for those other transactions involved in the airline flight purchase, etc. This information may be useful, for example, to see inconsistencies in transaction amounts, or to detect a fraudulent party.

Step 416 may include generating data based on the one or more selected attribute or dispute information of the received transaction information (e.g., from step 402) for the one or more other transactions involving the one or more selected attribute or dispute information. In various embodiments presented herein, the generated data may be collectively referred to as "blockchain analytics." For example, if the attribute of the original transaction that had been selected in step 408 to be analyzed is the consumer of the original transaction, blockchain analytics may show other trends based on other transactions of the consumer. These other transactions of the consumer may not have the rest of the same attributes as the original transaction. For example, these other transactions may be between the consumer and other merchants, for different good(s) and/or services, or conducted in entirely different geographical and/or temporal settings. The generated blockchain analytics may provide trends 416B in the consumer's other transactions, for example, the number of transactions conducted by the consumer over time, an inclination of the consumer towards transacting with certain merchants and/or merchant groups or for certain good(s) and/or services over time, and etc. In some embodiments, blockchain analytics may provide key statistics (e.g., mean, median, correlational data, etc.) for the one or more attributes of the original transaction, as being used in other transactions, for example. They key statistics may help identify patterns in the attribute (e.g., consumer behavior) that indicate fraud and/or initiate disputes.

Alternatively or additionally, step 416 may include generating blockchain analytics to analyze disputes/fraud data 416A to enable merchants and issuers (FIs) to reduce to occurrences of fraud. The fraud may include unintentional, "friendly" fraud and/or other types. For example, if one or more attributes being analyzed includes the good and/or service being transacted for in the original transaction, and the blockchain analytics indicates (e.g., in the trends 416B) that the particular good and/or service being transacted for has caused disputes or has been found to be fraudulent in multiple other transactions, a participant of the original transaction (e.g., merchant or consumer) who is seeking to transact the good and/or service may use this data to stop the transaction, and thereby prevent a future fraud from occurring. Thus, participants of the original transaction (e.g., merchant, consumer, etc.) may use the blockchain analytics data to pro-actively identify a fraudulent transaction and stop the shipment of goods/services. Analyzing trends 416B may lead one to predict future fraud or to prevent disputes.

Figure 5:
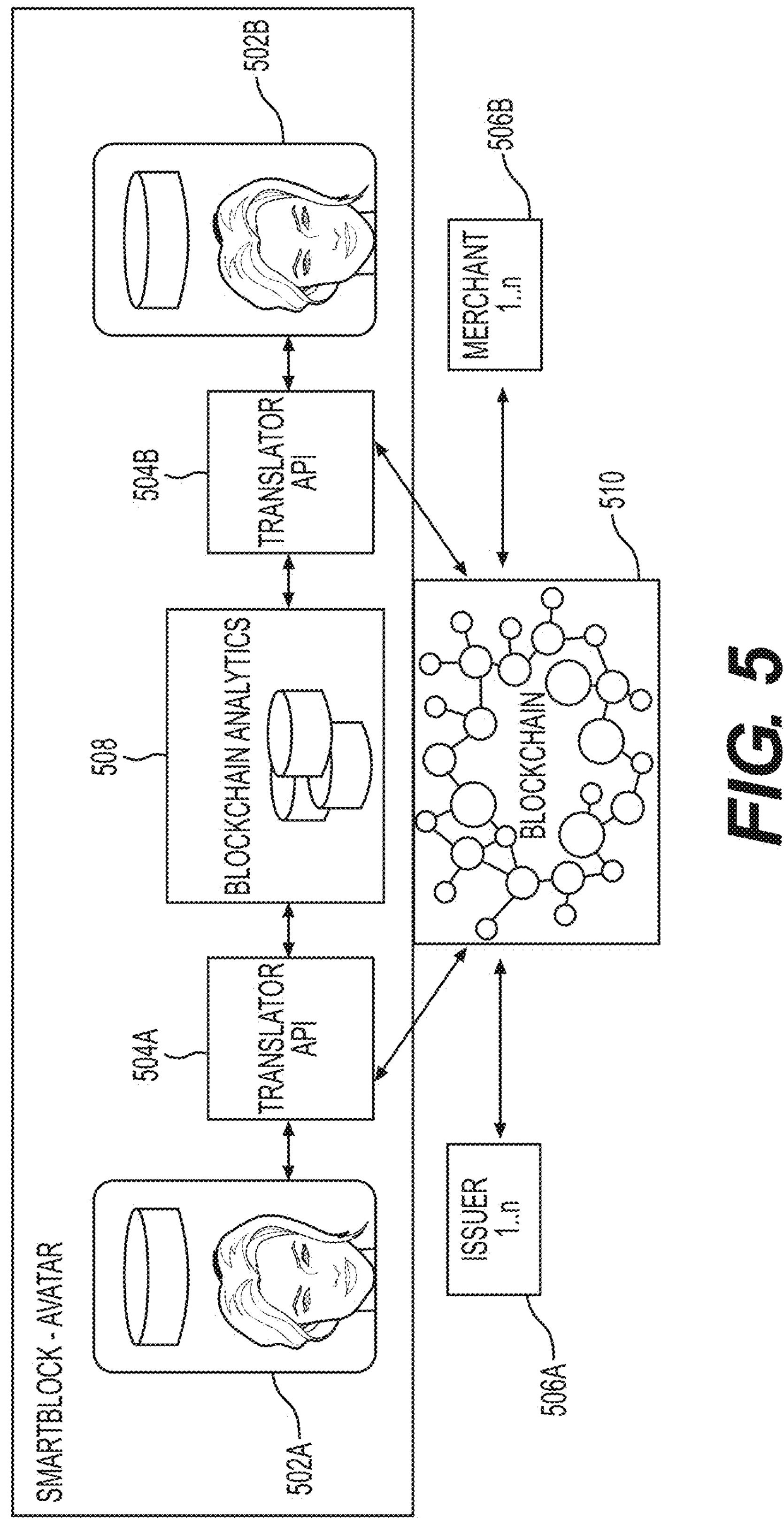
FIG. 5 depicts an exemplary flow diagram of an interactive bot feature of the user interface for analyzing transaction attributes and dispute information, using blockchain.

FIG. 5 depicts an exemplary flow diagram of an interactive bot feature of the user interface for analyzing transaction attributes and dispute information, using blockchain. The interactive bot ("SmartBot", "avatar," etc.), 502A and 502B, may be an artificial intelligence (AI) based application that can translate customer request and/or speech into system commands. The interactive bot, 502A and 502B, may available to the user of the user interface who seeks to view blockchain analytics data 508 generated from information in the blockchain 510. It is contemplated that this user may be a participant of the blockchain used in the transaction and dispute management system, and therefore this user may include, for example, an issuer 506A, or a merchant 506B.

The translator application program interface (API), 504A and 504B, may be the interface layer that may convert speech or text that is input by the user (e.g., an issuer 506A or a merchant 506B) via a user interface into commands that may retrieve information from or display various aspects of blockchain analytics 508. The blockchain analytics 508 may be generated based on the data that participants of the blockchain (e.g., issuers, consumers, merchants, and/or acquirers) add to the blockchain 510 and/or shared ledger, for example, during a transaction or transaction dispute management. Furthermore, blockchain analytics 508 may be generated based on methods presented in FIG. 4A-4B. Thus, blockchain analytics 508 may be a system that takes structured and/or unstructured data from, blockchain disputes system and may slice and dice the data to provide actionable insights.

The interactive bot technology may be used to enhance and improve customer experience and anticipate the customer before the customer explicitly requests information. Thus, the interactive bot technology can be effective in areas where participants of a transaction or transaction dispute need to be educated on the process and when to anticipate a response.

Interactive bots 502A and 502B may be dependent on the blockchain analytics 508 to drive the optimal customer experience and may provide useful information to participants (e.g., merchant, issuer, etc.) of the blockchain who are able to view blockchain analytics via a user interface. For example, a user may be able to gather information on the mean times for response for a disputing party of a transaction dispute based upon historical data.

Figure 6:
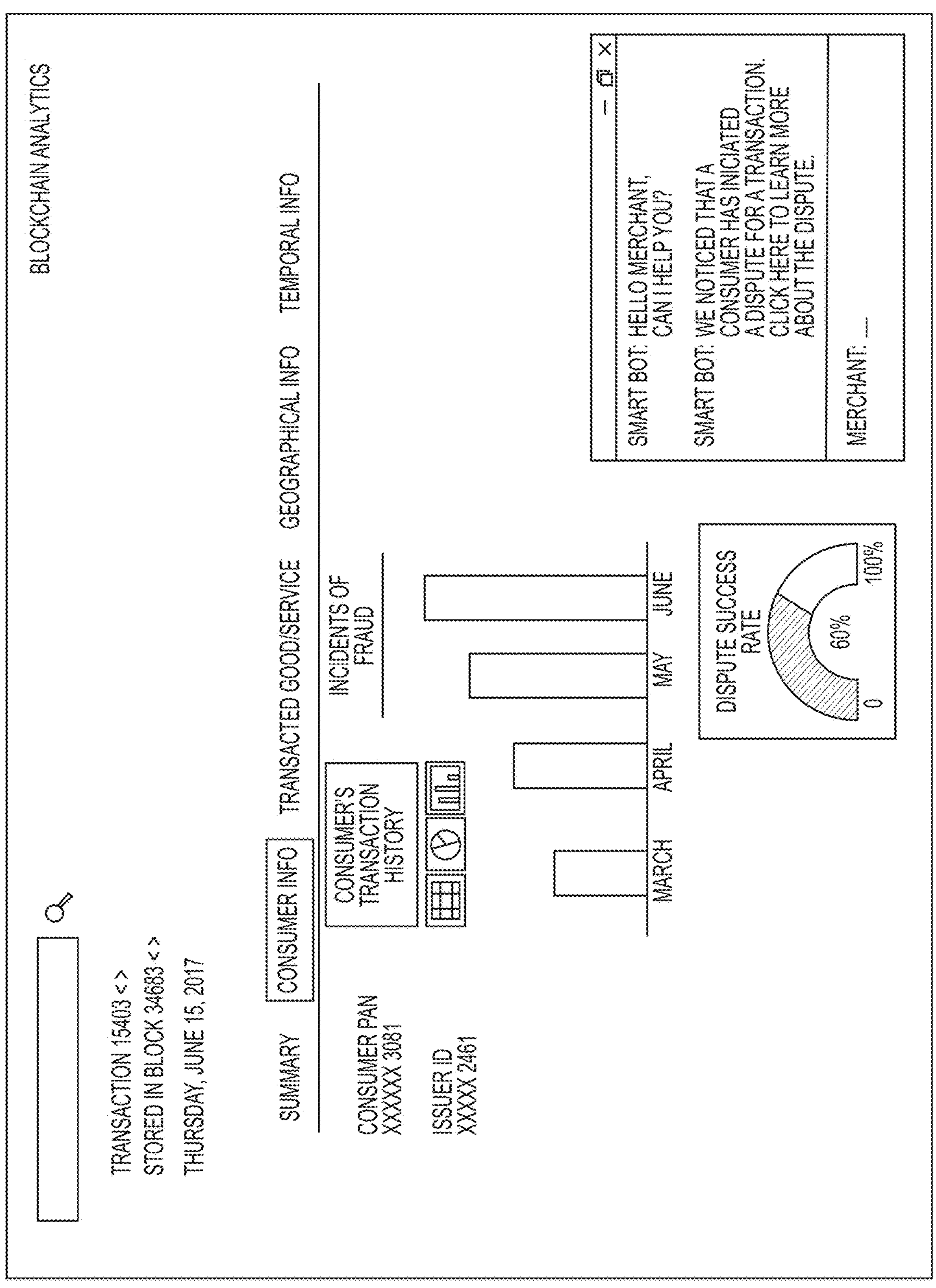
FIG. 6 depicts an exemplary screenshot of a user interface for analyzing transaction attributes and dispute information using blockchain.

FIG. 6 depicts an exemplary screenshot of a user interface for analyzing transaction attributes and dispute information using blockchain. Participants of the blockchain used in the systems and methods for transaction dispute management, as presented in various embodiments herein, may be able to view blockchain analytics on a user interface. The participants (e.g., issuer, merchant, acquirer, consumer, etc.) may include the parties of a transaction or a transaction dispute, and the blockchain analytics may be generated according to methods presented in FIGS. 4A-4B. As illustrated in an exemplary screenshot, the user interface may identify the original transaction 602, for which a user wishes to seek more information regarding one or more attributes of the transaction. Furthermore, the particular block 604 in which an attribute or transaction information is stored may also be identified. The user may be able to gain a summary 606 of the current transaction, or gain information on a particular attribute of the transaction. For example, a user may view information related to the consumer 608 of the transaction (or any other party of the transaction). As shown in FIG. 5, when selecting to gain more information about the consumer of the transaction, a user may be able to view, for example a consumer's transaction history 610, incidents of fraud 612, an encrypted identifier of the consumer's primary account number 614, an encrypted identifier of the user identification number 616. The user may be able to view the consumer's transaction history in multiple forms, e.g., tables 610A, pie charts 610B, bar graphs 610C, etc. A transaction history 610 of the consumer may display for example, the number of transactions conducted by the transaction over time 618. In some embodiments, the blockchain analytics may also present a consumer's overall success rate 620 in transaction disputes, for example, to ascertain how difficult it is to overcome a dispute settlement process with a consumer. The user may also be able to detect incidents of fraud 612 resulting from the consumer, for example, to proactively avoid fraud by stopping a transaction with the consumer.

In other embodiments, the user may also view information related to the transacted good(s) and/or service(s) of the transaction 622, geographical information of the transaction 624, temporal information of the transaction 626, or any other attribute. The methods of gaining more information for the various attributes of the current transaction may include gaining information on other transactions sharing the attribute, and may employ methods presented in FIGS. 4A-4B. In further embodiments, the user may also view information related to more than one attributes at a time. For example, blockchain analytics may provide information on a consumer's transaction involving a particular good and/or service over time (from other merchants, for example). In another example, blockchain analytics may be able to provide information on incidents of dispute arising from a particular participant of the blockchain over a particular transacted good or service. This information may be used, for example, to proactively identify and/or report fraud.

In some embodiments, the user interface may be able to enhance the user's experience in able to use blockchain analytics, via an interactive bot 628 (e.g., "SmartBot"). The interactive bot 628 may receive input from the user to direct the user towards finding the appropriate information from the blockchain analytics and/or use artificial intelligence (AI) technology to detect information about the user and proactively predict what the user may be looking for. The interactive bot may be implemented based on methods described in FIG. 5.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method for processing transaction attributes using a smart contract of a dispute management system, the method comprising:

receiving, by one or more processors, revised transaction data associated with a transaction originated at a merchant terminal, wherein the revised transaction data includes proposed revised attributes of the transaction;

accessing, by the one or more processors, a smart contract associated with the transaction in a blockchain shared ledger;

receiving, by the one or more processors, dispute data associated with the revised transaction data from an information handling device associated with a participant of the blockchain shared ledger, wherein the dispute data includes disputed attributes of the proposed revised attributes of the transaction;

generating, by the one or more processors, a first blockchain entry locked with a first crypto private key in the blockchain shared ledger, wherein the first blockchain entry comprises the proposed revised attributes, the dispute data, and proposed modifications to the proposed revised attributes;

generating, by the one or more processors and in the blockchain shared ledger, a second blockchain entry using the smart contract and based on the first blockchain entry;

automatically initiating, by the one or more processors, a dispute resolution process using the smart contract based on the first blockchain entry and the second blockchain entry; and generating, by the one or more processors, a third blockchain entry in the blockchain shared ledger, wherein the third blockchain entry comprises a result of the dispute resolution process, and wherein the result comprises one or more corrected attributes associated with the proposed revised attributes.

2. The computer-implemented method of claim 1, further comprising:

transmitting, by the one or more processors, the transaction to a payment network for processing according to the one or more corrected attributes.

3. The computer-implemented method of claim 1, further comprising:

generating, by the one or more processors, the smart contract in the blockchain shared ledger using transaction attributes of the transaction originated at the merchant terminal.

4. The computer-implemented method of claim 3, wherein the transaction attributes comprise one or more of a merchant identifier, a consumer identifier, a transaction amount, a product identifier, and a location of the merchant terminal.

5. The computer-implemented method of claim 1, further comprising:

transmitting, by the one or more processors and to a user interface of the information handling device associated with the participant of the blockchain shared ledger, a prompt prompting the participant to respond to the result of the dispute resolution process.

6. The computer-implemented method of claim 1, further comprising:

receiving, by the one or more processors and from the information handling device associated with the participant of the blockchain shared ledger, second dispute data associated with the one or more corrected attributes, wherein the second dispute data includes second disputed attributes of the one or more corrected attributes; and automatically initiating, by the one or more processors, a second dispute resolution process using the smart contract, wherein the smart contract defines a number of times that dispute resolution can be re-initiated.

7. The computer-implemented method of claim 1, wherein the transaction is not transmitted to a payment network for processing until the dispute resolution process is completed.

8. A decentralized computing system for processing transaction attributes using a smart contract, the system comprising:

a memory storing instructions; and one or more processors operatively connected to the memory and configured to execute the instructions to perform operations comprising:

receiving revised transaction data associated with a transaction originated at a merchant terminal, wherein the revised transaction data includes proposed revised attributes of the transaction;

accessing a smart contract associated with the transaction in a blockchain shared ledger;

receiving dispute data associated with the revised transaction data from an information handling device associated with a participant of the blockchain shared ledger, wherein the dispute data includes disputed attributes of the proposed revised attributes of the transaction;

generating a first blockchain entry locked with a first crypto private key in the blockchain shared ledger, wherein the first blockchain entry comprises the proposed revised attributes, the dispute data, and proposed modifications to the proposed revised attributes;

generating, in the blockchain shared ledger, a second blockchain entry using the smart contract and based on the first blockchain entry;

automatically initiating a dispute resolution process using the smart contract based on the first blockchain entry and the second blockchain entry; and generating a third blockchain entry in the blockchain shared ledger, wherein the third blockchain entry comprises a result of the dispute resolution process, and wherein the result comprises one or more corrected attributes associated with the proposed revised attributes.

9. The system of claim 8, the operations further comprising:

transmitting the transaction to a payment network for processing according to the one or more corrected attributes.

10. The system of claim 8, the operations further comprising:

generating the smart contract in the blockchain shared ledger using transaction attributes of the transaction originated at the merchant terminal.

11. The system of claim 10, wherein the transaction attributes comprise one or more of a merchant identifier, a consumer identifier, a transaction amount, a product identifier, and a location of the merchant terminal.

12. The system of claim 8, the operations further comprising:

transmitting, to a user interface of the information handling device associated with the participant of the blockchain shared ledger, a prompt prompting the participant to respond to the result of the dispute resolution process.

13. The system of claim 8, the operations further comprising:

receiving, from the information handling device associated with the participant of the blockchain shared ledger, second dispute data associated with the one or more corrected attributes, wherein the second dispute data includes second disputed attributes of the one or more corrected attributes; and automatically initiating a second dispute resolution process using the smart contract, wherein the smart contract defines a number of times that dispute resolution can be re-initiated.

14. The system of claim 8, wherein the transaction is not transmitted to a payment network for processing until the dispute resolution process is completed.

15. A non-transitory machine-readable medium storing instructions that, when executed by one or more processors of a detection system, cause the one or more processors to perform a method for processing transaction attributes using a smart contract of a dispute management system, the method comprising:

receiving, by the one or more processors, revised transaction data associated with a transaction originated at a merchant terminal, wherein the revised transaction data includes proposed revised attributes of the transaction;

accessing, by the one or more processors, a smart contract associated with the transaction in a blockchain shared ledger;

receiving, by the one or more processors, dispute data associated with the revised transaction data from an information handling device associated with a participant of the blockchain shared ledger, wherein the dispute data includes disputed attributes of the proposed revised attributes of the transaction;

generating, by the one or more processors, a first blockchain entry locked with a first crypto private key in the blockchain shared ledger, wherein the first blockchain entry comprises the proposed revised attributes, the dispute data, and proposed modifications to the proposed revised attributes;

generating, by the one or more processors and in the blockchain shared ledger, a second blockchain entry using the smart contract and based on the first blockchain entry;

automatically initiating, by the one or more processors, a dispute resolution process using the smart contract based on the first blockchain entry and the second blockchain entry; and generating, by the one or more processors, a third blockchain entry in the blockchain shared ledger, wherein the third blockchain entry comprises a result of the dispute resolution process, and wherein the result comprises one or more corrected attributes associated with the proposed revised attributes.

16. The non-transitory machine-readable medium of claim 15, the method further comprising:

transmitting, by the one or more processors, the transaction to a payment network for processing according to the one or more corrected attributes.

17. The non-transitory machine-readable medium of claim 15, the method further comprising:

generating, by the one or more processors, the smart contract in the blockchain shared ledger using transaction attributes of the transaction originated at the merchant terminal.

18. The non-transitory machine-readable medium of claim 17, wherein the transaction attributes comprise one or more of a merchant identifier, a consumer identifier, a transaction amount, a product identifier, and a location of the merchant terminal.

19. The non-transitory machine-readable medium of claim 15, the method further comprising:

transmitting, by the one or more processors and to a user interface of the information handling device associated with the participant of the blockchain shared ledger, a prompt prompting the participant to respond to the result of the dispute resolution process.

20. The non-transitory machine-readable medium of claim 15, wherein the transaction is not transmitted to a payment network for processing until the dispute resolution process is completed.

* * * * *